US012131212B2

(12) United States Patent
Namikawa et al.

(10) Patent No.: US 12,131,212 B2
(45) Date of Patent: Oct. 29, 2024

(54) READER, RFID SYSTEM, AND STATE DETECTION SYSTEM

(71) Applicants: Konica Minolta, Inc., Tokyo (JP); GIT JAPAN INCORPORATED, Shiga (JP)

(72) Inventors: Taketo Namikawa, Tokyo (JP); Hirokazu Nakayama, Yasu (JP); Norio Fujita, Koka (JP)

(73) Assignees: KONICA MINOLTA, INC., Tokyo (JP); GIT JAPAN INCORPORATED, Shiga (JP)

( * ) Notice: Subject to any disclaimer, the term of this patent is extended or adjusted under 35 U.S.C. 154(b) by 18 days.

(21) Appl. No.: 18/000,056

(22) PCT Filed: Apr. 2, 2021

(86) PCT No.: PCT/JP2021/014255
§ 371 (c)(1),
(2) Date: Nov. 28, 2022

(87) PCT Pub. No.: WO2021/246041
PCT Pub. Date: Dec. 9, 2021

(65) Prior Publication Data
US 2023/0222298 A1 Jul. 13, 2023

(30) Foreign Application Priority Data
Jun. 2, 2020 (JP) .................................. 2020-096142

(51) Int. Cl.
*G06K 7/08* (2006.01)
*G06K 19/067* (2006.01)
*H04B 1/59* (2006.01)

(52) U.S. Cl.
CPC ............. *G06K 7/08* (2013.01); *G06K 19/067* (2013.01); *H04B 1/59* (2013.01)

(58) Field of Classification Search
None
See application file for complete search history.

(56) References Cited

FOREIGN PATENT DOCUMENTS

| JP | 2001-134726 A | 5/2001 |
|----|---------------|--------|
| JP | 2010261752 A * | 11/2010 |

(Continued)

OTHER PUBLICATIONS

Machine translation of JP 2010261752 retrieved from the European Patent Office website, retrieved Aug. 20, 2024 (Year: 2024).*

(Continued)

*Primary Examiner* — Suezu Ellis
(74) *Attorney, Agent, or Firm* — LUCAS & MERCANTI, LLP

(57) ABSTRACT

A reader includes: a transmission device that repeatedly transmits, at a cycle corresponding to the code length of a prescribed code string, an electromagnetic wave that is phase-adjusted with the prescribed code string; a reception device that receives the reflected wave from the object to be identified, cyclically overlaps a reception signal relating to the reflected wave at the cycle of the code length, and calculates the correlation value of the overlapped result and the prescribed code string; and a control device that controls the transmission device and varies the transmission frequency of the electromagnetic wave in a steplike manner to perform a frequency sweep within a prescribed frequency band, controls the reception device, causing the reception device to calculate the correlation value for each transmission frequency, and specifies the attributes of the object to be identified on the basis of the correlation value for each transmission frequency.

7 Claims, 8 Drawing Sheets

(56) References Cited

FOREIGN PATENT DOCUMENTS

| JP | 2017-199240 A | 11/2017 |
| JP | 2018-207687 A | 12/2018 |
| WO | 2019/064989 A1 | 4/2019 |

OTHER PUBLICATIONS

International Search Report for the corresponding patent application No. PCT/JP2021/014255 dated Jun. 1, 2021, with English translation.

* cited by examiner

READER, RFID SYSTEM, AND STATE DETECTION SYSTEM

CROSS REFERENCE TO RELATED APPLICATION

This Application is a 371 of PCT/JP2021/014255 filed on Apr. 2, 2021, which claimed priority of Japanese Application No. 2020-096142 filed Jun. 2, 2020, both of which are incorporated herein by reference.

TECHNICAL FIELD

The present disclosure relates to a reader, an RFID system, and a state detection system.

BACKGROUND ART

Recently, as a technique that replaces barcodes and electronic tags in which an IC chip is built, an RFID system using a tag called a "chipless RFID tag" has been attracting attention (e.g., see Patent Literature (hereinafter, referred to as PTL) 1 and PTL 2).

In this type of RFID system, the chipless RFID tag does not include an integrated circuit in the tag and forms identification information by a reflection characteristic when an electromagnetic wave is emitted. Typically, this type of chipless RFID tag includes a plurality of resonant elements having resonant frequencies different from each other on the base material of the tag, and represents identification information by the combination of the resonant elements. Then, in this type of RFID system, a reader emits an electromagnetic wave to the chipless RFID tag and detects the reflection characteristic of the chipless RFID tag, so that the reader reads the identification information attached to the chipless RFID tag.

In another aspect, this type of electromagnetic-wave read-type tag has been used as a chipless sensor tag for a state detection system that detects a change in a state of an object or an environment in a non-contact manner (e.g., see PTL 4). The chipless sensor tag is, for example, configured to include a resonant element physically associated with a state of the detection target and to detect a change in the state of the detection target from a change in the resonant frequency of the resonant element. Then, the state change in the detection target that the chipless sensor tag detects is read by the reader as a change in the reflection spectrum.

CITATION LIST

Patent Literatures

PTL 1
WO 2019/064989
PTL 2
Japanese Patent Application Laid-Open No. 2017-199240
PTL 3
Japanese Patent Application No. 2018-207687
PTL 4
Japanese Patent Application Laid-Open No. 2001-134726

SUMMARY OF INVENTION

Technical Problem

Incidentally, in the RFID system or the state detection system that reads an attribute (meaning identification information of the chipless RFID tag or a state of a detection target that a chipless sensor tag detects; the same applies hereinafter) from the electromagnetic wave reflection characteristic as described above, it is required for the reader, when reading an attribute of the tag, to transmit an electromagnetic wave while changing a frequency in a predetermined frequency band, receive a reflection wave from the tag to which the electromagnetic wave is transmitted, and then detect a resonant frequency of the resonant element that the tag includes.

At the stage of research and development of the RFID system and a state detection system, a vector network analyzer, which can transmit and receive a high frequency electromagnetic wave and has a highly accurate reception capability, is used. However, miniaturization of a reader and cost reduction with a simple configuration are demanded for practical use; therefore, the vector network analyzer is not suitable for practical use in this respect.

On the other hand, in order to practically use the RFID system and the state detection system, the entire system has been miniaturized (e.g., miniaturization of an antenna of a tag and/or a reader), and accordingly, it has being extremely difficult to secure an SN ratio. Thus, enhancing accuracy of reading identification information is also an urgent problem.

The present disclosure is made in consideration of the above problem, and an object of the present disclosure is to provide a reader, an RFID system, and a state detection system each capable of identifying an attribute of an identification target (e.g., identification information attached to a chipless RFID tag or a state of a detection target that a chipless sensor tag detects) with a simple configuration and high accuracy.

Solution to Problem

The present disclosure for solving the above-described problem is a reader emitting an electromagnetic wave to an identification target and reading an attribute of the identification target from a reflection characteristic of the identification target, the reader including: a transmission device that repeatedly transmits an electromagnetic wave whose phase is modulated with a predetermined code sequence at a period corresponding to a code length of the predetermined code sequence; a reception device that receives a reflection wave from the identification target, synchronously superposes a reception signal related to the reflection wave at a period of the code length, and calculates a correlation value between a result of the superposition and the predetermined code sequence; and a control device that controls the transmission device to change a transmission frequency of the electromagnetic wave in a stepwise shape so as to sweep frequencies within a predetermined frequency band, controls the reception device to calculate the correlation value at each transmission frequency, and specifies the attribute of the identification target based on the correlation value at each transmission frequency.

In other aspects, the present disclosure is an RFID system including the reader of the above configuration.

In other aspects, the present disclosure is a state detection system including the reader of the above configuration.

Advantageous Effects of Invention

According to the reader of the present disclosure, it is possible to identify an attribute of an identification target with a simple configuration and high accuracy.

DESCRIPTION OF EMBODIMENTS

Figure 1:
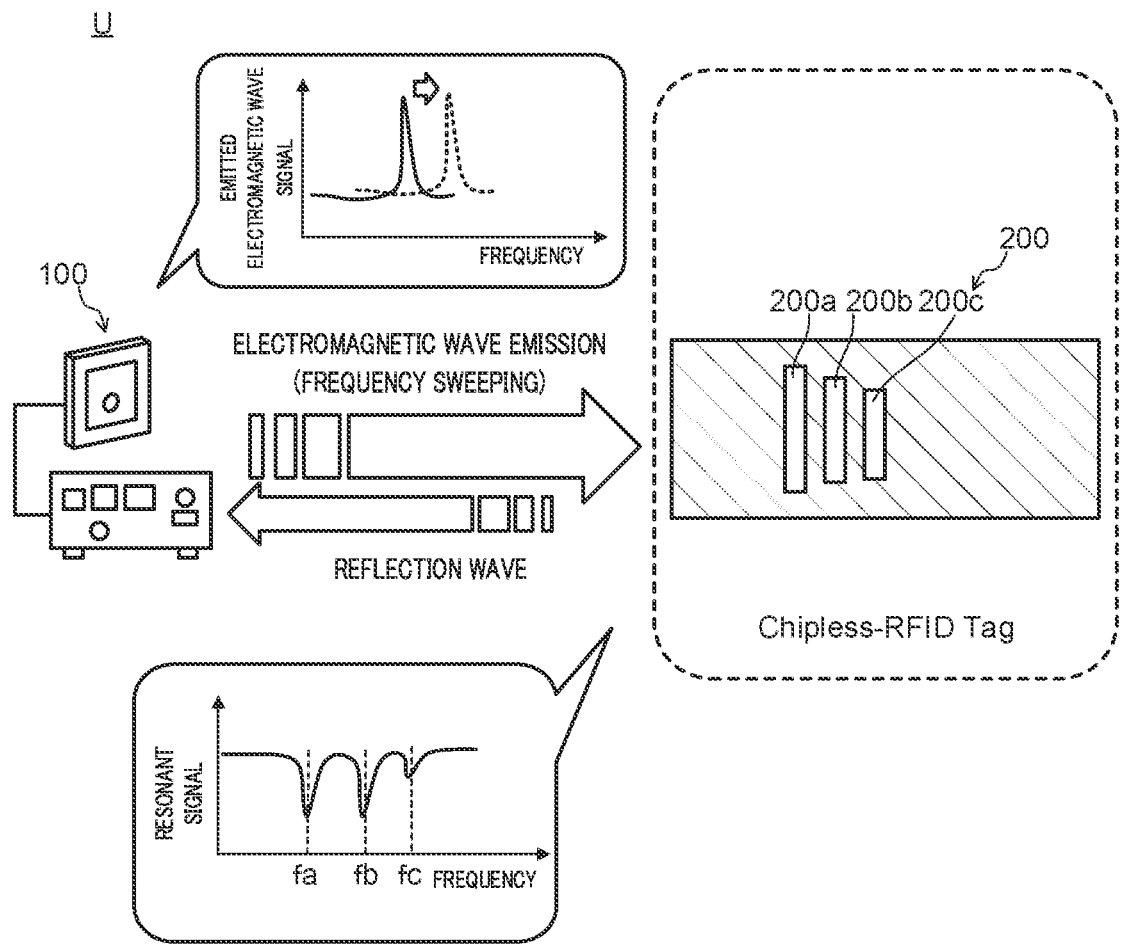
FIG. 1 illustrates a configuration of an RFID system according to an embodiment of the present invention.

Hereinafter, preferred embodiments of the present disclosure will be described in detail with reference to the appended drawings. Note that elements having substantially the same functions are assigned the same reference numerals in the description and drawings, and duplicated descriptions thereof are omitted.

Embodiment 1

First, a configuration of an RFID system according to Embodiment 1 will be described with reference to FIG. 1.

FIG. 1 illustrates a configuration of RFID system U according to the embodiment.

RFID system U according to the embodiment includes reader 100 and chipless RFID tag 200.

Chipless RFID tag 200 (hereinafter, referred to as "tag 200") forms identification information by a reflection characteristic (that is, a frequency characteristic of a reflection wave) to an electromagnetic wave emitted from the outside (here, reader 100).

Tag 200 includes a plurality of resonant elements that resonate when an electromagnetic wave of a predetermined frequency is emitted. Further, tag 200 has a reflection characteristic that absorbs the electromagnetic wave of the frequency matching with the resonant frequency of each of the plurality of the resonant elements and reflects the electromagnetic wave when the electromagnetic wave of the frequency other than the matching frequency is emitted. That is, tag 200 forms identification information using power loss (absorption) by the resonance as a signal.

FIG. 1 illustrates three slot type resonant elements 200a, 200b, and 200c as an example of resonant elements formed in tag 200. Slot type resonant elements 200a, 200b, and 200c are each formed of a slot formed by hollowing a portion of a solid conductive layer (hereinafter, may be simply referred to as "resonant elements 200a, 200b, and 200c").

Resonant elements 200a, 200b, and 200c resonate when the approximately a half wave length of the emitted electromagnetic wave corresponds to the length of its own pattern. The plurality of resonant elements 200a, 200b, and 200c are formed so as to have different resonant frequencies from each other. As a reflection characteristic of tag 200 illustrated in FIG. 1, resonant peaks (absorption signals) are indicated in the frequencies corresponding to resonant frequencies fa, fb, and fc (hereinafter, also referred to as resonant frequencies of tag 200) of the plurality of respective resonant elements 200a, 200b, and 200c formed in tag 200.

The identification information formed by tag 200 is associated with the resonant frequencies of each of the plurality of resonant elements 200a, 200b, and 200c formed in tag 200, and, for example, is represented as "0010100" or the like with an identification code of the digit number corresponding to the resonant frequency represented as "1".

The resonant elements of tags 200 can be formed so that the resonant frequency is in a millimeter-wave or a giga-wave frequency band (1 GHz to 3 THz), for example, but here, the resonant elements are formed in an UWB band of 3.1 GHz to 10.6 GHz available in a wide band.

Reader 100 transmits and directs an electromagnetic wave of a high frequency (e.g., a band from 1 GHz to 10 GHz) to tag 200. At this time, reader 100 transmits the electromagnetic wave so as to sweep transmission frequencies within a predetermined frequency band, and detects the resonant frequencies of resonant elements 200a, 200b, and 200c of tag 200 based on the reflection characteristics of the reflection waves (see FIG. 5) from tag 200 when the electromagnetic wave is transmitted.

Figure 2:
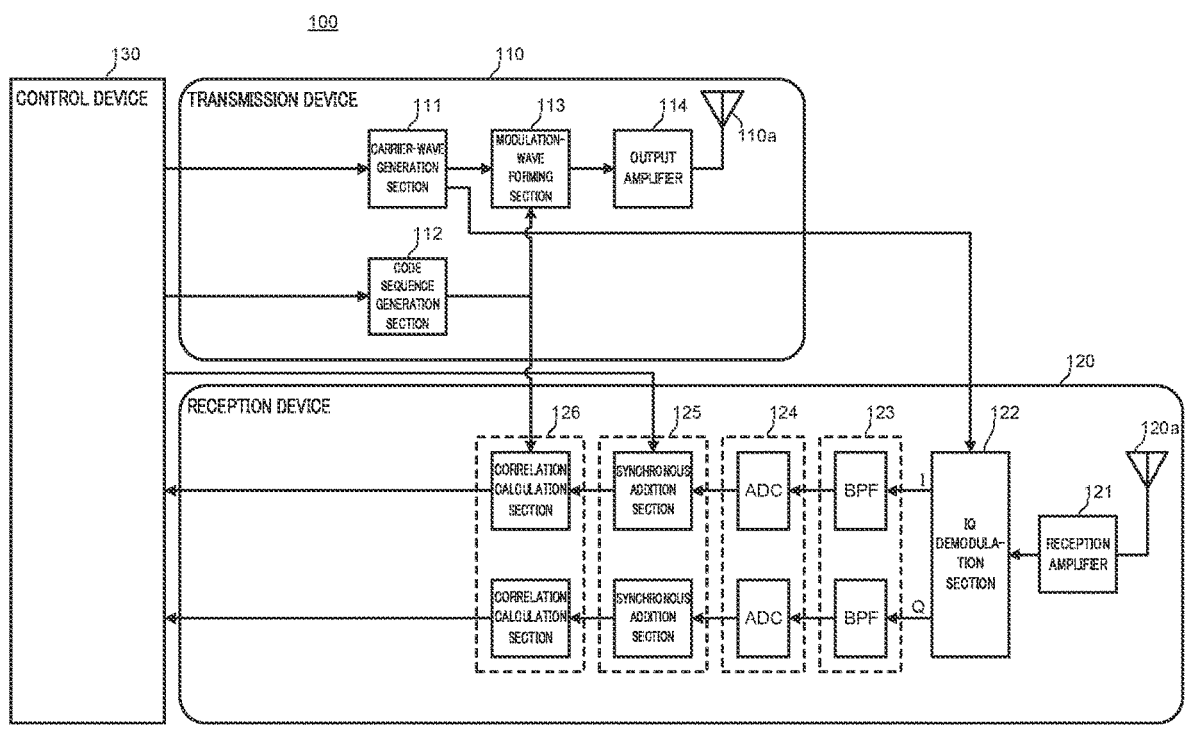
FIG. 2 illustrates a configuration of a reader according to the embodiment of the present invention.
Figure 3A:
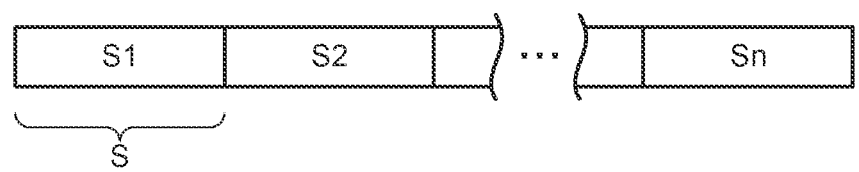
FIGS. 3A, 3B, and 3C are diagrams for describing a synchronous addition processing executed by a reception device according to the embodiment of the present invention.
Figure 3B:
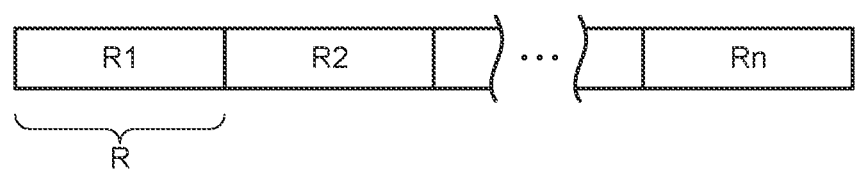
Figure 3C:
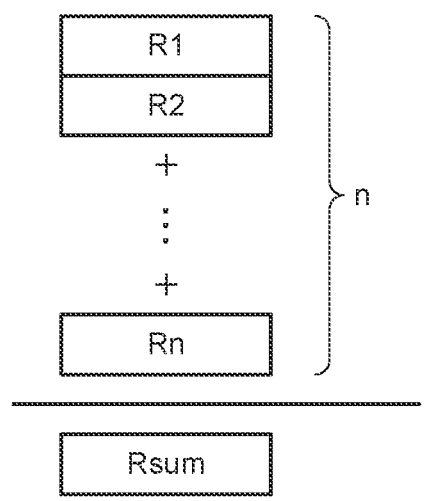
Figure 4:
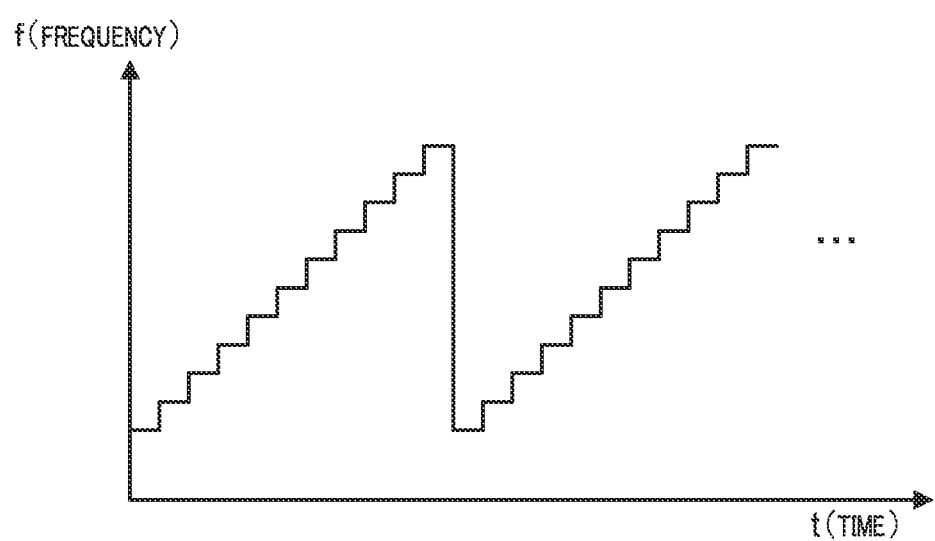
FIG. 4 illustrates a control state of a transmission frequency by a control device according to the embodiment of the present invention.
Figure 5:
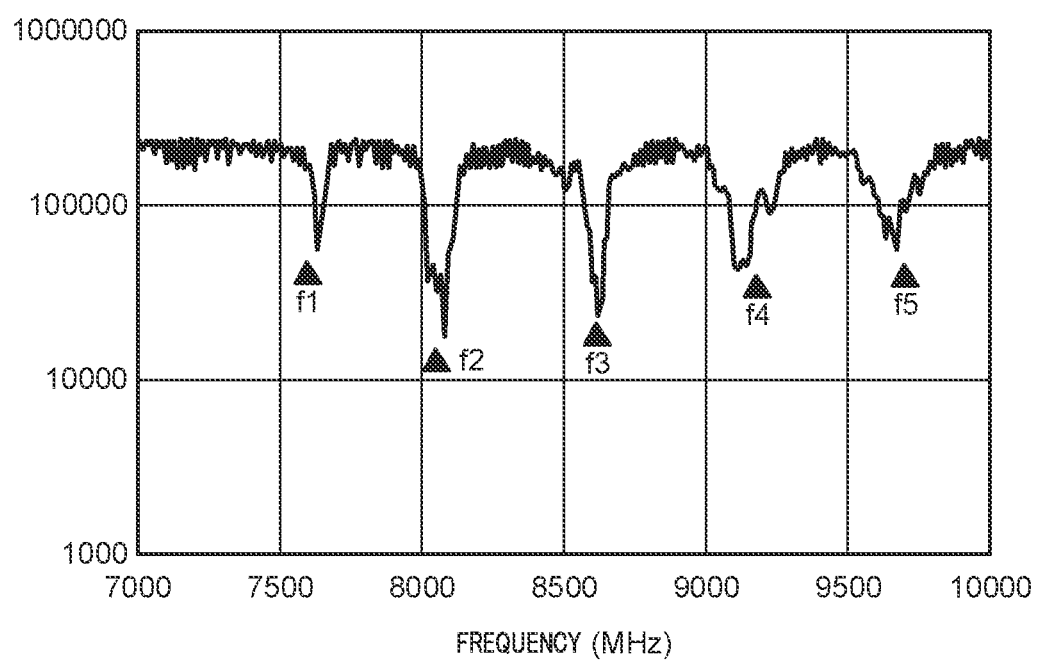
FIG. 5 illustrates an exemplary reflection characteristic of a tag detected by a reader according to the embodiment of the present invention.

FIG. 2 illustrates a configuration of reader 100 according to the embodiment of the present invention. FIG. 3 (FIGS. 3A, 3B, and 3C) is a diagram for describing a synchronous addition processing executed by reception device 120 according to the embodiment of the present invention. FIG. 4 illustrates a control state of a transmission frequency by control device 130 according to the embodiment of the present invention. FIG. 5 illustrates an exemplary reflection characteristic (a frequency spectrum of a reflection wave) of tag 200 detected by reader 100 according to the embodiment of the present invention.

Reader 100 includes transmission device 110, reception device 120, and control device 130.

Transmission device 110 transmits an electromagnetic wave whose phase is modulated (Phase Shift keying (PSK)) with a predetermined code sequence from transmission antenna 110a repeatedly at a period corresponding to the code length of the predetermined code sequence.

Specifically, transmission device 110 includes transmission antenna 110a, carrier-wave generation section 111, code sequence generation section 112, modulation-wave forming section 113, and output amplifier 114.

Carrier-wave generation section 111 forms a carrier wave of a predetermined frequency. Note that a frequency of a carrier wave generated by carrier-wave generation section 111 is controlled based on a control signal from control device 130.

Code sequence generation section 112 generates a signal including a predetermined code sequence. It is preferred that the predetermined code sequence generated by code sequence generation section 112 have a good autocorrelation characteristic and have a low cross-correlation with other signals, and thus, a Pseudo Noise (PN) code (e.g., an M-sequence code) is preferred, for example. Note that, when an M-sequence code is used as the code sequence, the code length (the total number of code sequences) is $(2^N-1)$ (where N is a positive integer and is set to, e.g., N=about 2 to 10).

Hereinafter, the term "predetermined code sequence" means a code sequence generated by code sequence generation section 112.

Modulation-wave forming section 113 forms a modulation wave obtained by phase-modulating the carrier wave output from carrier-wave generation section 111 with a predetermined code sequence output from code sequence generation section 112. For example, modulation-wave forming section 113 applies a phase modulation of phase 0 or π (that is, BPSK) to the carrier wave based on the predetermined code sequence and outputs this modulation wave to the side of transmission antenna 110a (here, output amplifier 114).

Output amplifier 114 amplifies the modulation wave output from modulation-wave forming section 113, and transmits the amplified modulation wave to transmission antenna 110a.

As described above, the phase-modulated electromagnetic wave having a peak intensity at a single frequency is transmitted from transmission antenna 110a. Note that transmission device 110 transmits the electromagnetic wave phase-modulated with a predetermined code sequence from transmission antenna 110a repeatedly at a period corresponding to the code length of the predetermined code sequence so that reception device 120 performs a synchronous addition processing.

Reception device 120 receives a reflection wave from tag 200 at reception antenna 120a and converts the reception signal related to the reflection wave into a digital signal. Then, reception device 120 extracts the converted digital signal at a period of the code length of the predetermined code sequence, synchronously superposes a signal part corresponding to the code length of the predetermined code sequence, and calculates a correlation value between the result of the superposition and the predetermined code sequence.

Specifically, reception device 120 includes reception antenna 120a, reception amplifier 121, IQ demodulation section 122, bandpass filter 123, AD conversion section 124, synchronous addition section 125, and correlation calculation section 126. Note that bandpass filter 123, AD conversion section 124, synchronous addition section 125, and correlation calculation section 126 each include a processing circuit for processing a signal of an I component (hereinafter, referred to as an I signal) and a processing circuit for processing a signal of a Q component (hereinafter, referred to as a Q signal), which is an orthogonal component to the I component. The circuits are provided in parallel to each other.

Reception amplifier 121 amplifies the reception signal related to the reflection wave received by reception antenna 120a, and outputs the amplified reception signal to IQ demodulation section 122.

IQ demodulation section 122 converts the reception signal output from reception amplifier 121 into an IQ signal (hereinafter, simply referred to as "IQ signal") using the local signal obtained from carrier-wave generation section 111 of transmission device 110.

Bandpass filter 123 performs a filtering processing to the IQ signal output from IQ demodulation section 122 to remove signal components of unnecessary frequency bands.

AD conversion section 124 converts the IQ signal (analog signal) output from bandpass filter 123 into a digital signal.

Synchronous addition section 125 sequentially extracts the digitally-converted IQ signal sequentially output from AD conversion section 124 at a period of the code length of the predetermined code sequence, and synchronously superposes a signal part corresponding to the code length of the predetermined code sequence. Note that synchronous addition section 125 is configured to reset the synchronous addition processing based on a control signal from control device 130, and synchronous addition section 125 executes the synchronous addition processing at each transmission frequency of the electromagnetic wave (to be described later with reference to FIGS. 3 and 4).

Correlation calculation section 126 inputs a signal having the predetermined code sequence that has been used for the modulation processing in code sequence generation section 112. Then, correlation calculation section 126 calculates a correlation value between the reception signal (here, IQ signal) after the synchronous addition and the signal (that is, the predetermined code sequence) that code sequence generation section 112 generates. Afterward, correlation calculation section 126 transmits the signal (hereinafter, simply referred to as a "correlation value") obtained by the calculation processing and indicating the correlation value between the predetermined code sequence and the reception signal (here, IQ signal) after the synchronous addition to control device 130.

In the present embodiment, each of the correlation values of the I signal and the Q signal are transmitted from correlation calculation section 126 to control device 130. Then, control device 130 calculates the amplitude information and/or the phase information of the reflection wave component from tag 200 from the correlation values of the I signal and the Q signal. Note that the signals input to each of the processing circuit for the I signal processing and the processing circuit for the Q signal processing in correlation calculation section 126 are the same as each other.

Note that, in FIG. 2, synchronous addition section 125 and correlation calculation section 126 are configured separately, but synchronous addition section 125 and correlation calculation section 126 may be configured integrally. For example, the synchronous addition and the correlation calculation may be collectively performed by adding (adding at 1 and subtracting at 0) in accordance with the bit of the predetermined code sequence used for modulation.

Control device 130 controls transmission device 110 (carrier-wave generation section 111) to change the transmission frequency of the electromagnetic wave in a stepwise shape so as to sweep frequencies within a predetermined frequency band, and controls reception device 120 (synchronous addition section 125 and correlation calculation section 126) to cause reception device 120 (synchronous addition section 125 and correlation calculation section 126) to execute the synchronous addition processing and the correlation calculation processing at each transmission frequency (see FIG. 4).

At this time, control device 130 changes the transmission frequency of the electromagnetic wave stepwisely within the predetermined frequency band so that the predetermined code sequence repeats twice or more in the same transmission frequency. Then, control device 130 causes, at the timing of changing the transmission frequency of the electromagnetic wave as a trigger, reception device 120 to reset the synchronous addition processing and to calculate a correlation value at each transmission frequency of the electromagnetic wave.

However, the number of times of the predetermined code sequence transmitted in the same transmission frequency may be one. In this case, for example, it is preferred that synchronous addition section 125 and correlation calculation section 126 be integrally configured to add (add at 1 and subtract at 0) in accordance with a bit of the predetermined code sequence used for modulation.

Control device 130 obtains a correlation value of the electromagnetic wave at each transmission frequency, which is calculated in reception device 120, and recognizes the result as a reflection characteristic of tag 200. Then, control device 130 refers to a previously-stored data table associating the resonant frequency and the identification information with each other, and generates the identification information attached to tag 200 from the reflection characteristic of tag 200.

Here, the processing of reading identification information of tag 200 by reader 100 according to the present embodiment will be described.

When the electromagnetic wave is directed to tag 200 according to the present embodiment, in case that the transmission frequency of the electromagnetic wave matches with resonant frequencies fa, fb, and fc, tag 200 absorbs the electromagnetic wave, and in case that the transmission frequency of the electromagnetic wave does not match with resonant frequencies fa, fb, and fc, tag 200 reflects the electromagnetic wave. Thus, when reader 100 temporally changes the transmission frequency of the electromagnetic wave so as to sweep frequencies within the predetermined frequency band, reader 100 detects a reflection characteristic of tag 200 (that is, a frequency characteristic of the reflection wave of tag 200) as an intensity change of the reflection wave from tag 200 at each transmission frequency.

In practice, however, it is often difficult for reader 100 to accurately capture the intensity change of the reflection wave from tag 200 at each transmission frequency because of the influence of noise (e.g., thermal noise mixed inside reception device 120). In such circumstances, even though the reception wave in which the component of the reflection wave from tag 200 is supposed to be included is amplified, the reception wave is amplified with the noise (e.g., thermal noise mixed in reception device 120) included therein.

Therefore, reader 100 according to the present embodiment extracts the component of the reflection wave from tag 200 from the reception wave received at reception antenna 120a and detects the reflection characteristic of tag 200 by the following synchronous addition processing and correlation calculation processing.

In reader 100 according to the present embodiment, as described in FIG. 3A, the electromagnetic wave phase-modulated with the predetermined code sequence is used as signal wave S of one period, and transmission device 110 repeatedly transmits signal wave S of one period, for example, transmits S1, S2, S3, . . . , and Sn. Then, in reception device 120, the signal intensity of the reflection wave from tag 200 at each transmission frequency is specified from the result of synchronously adding signal wave S of one period for a predetermined number of times. Note that FIG. 3A illustrates a state in which transmission device 110 repeatedly transmits signal wave S of one period for n times. The number of repetitions is set to, for example, two or more and less than 1000 times.

At this time, as illustrated in FIG. 3B, the reception signal related to the reflection wave received by reception device 120 includes signal parts of a known length corresponding to the transmitted predetermined code sequence with the signal parts consecutively connecting with each other. Then, reception device 120 (synchronous addition section 125) first extracts this digital signal at a period corresponding to the code length of the predetermined code sequence, and then repeatedly obtains the signal part corresponding to the code length of the predetermined code sequence from this digital signal. That is, reception device 120 (synchronous addition section 125) sections the digital signal at a period corresponding to the code length of the predetermined code sequence used at the time of transmission, divides the digital signal into signal parts R corresponding to the code length of the predetermined code sequence as illustrated in 3B, and obtains a required number of signal parts (typically, R1, R2, . . . , and Rn corresponding to the number of repetitions of signal wave S transmitted by transmission device 110).

Then, reception device 120 (synchronous addition section 125) synchronously superposes the signal parts (R1, R2, . . . , and Rn) for the number of times required for identification as illustrated in 3C, and obtains signal part Rsum that is a combined single signal part as a result of the summing. In general, the noise included in the reception signal is a white noise signal; therefore, only a portion of the code sequence included in the original signal is amplified from the noise by the synchronous addition processing.

Next, reception device 120 (correlation calculation section 126) calculates a correlation value between combined signal Rsum and the predetermined code sequence (known data) used for modulation of the electromagnetic wave and transmitted from transmission device 110 in order to determine whether the reception signal includes the component of the reflection wave from tag 200. The correlation value obtained by this calculation indicates the intensity of the reflection wave from tag 200. In the present invention, the amplitude information of the reflection wave component received from tag 200 and included in the reception signal is calculated from each correlation value of the I signal and the Q signal, and the amplitude information is specified as the intensity of the reflection wave from tag 200. The calculation of the above-described correlation value can be realized by, for example, a known Fourier transform or the like.

Note that, in case where the number of additions of the signal part is n, and when the noise mixed in the reception signal is a Gaussian noise, it is known that the component of the noise reduces relatively at a ratio of $1/\sqrt{n}$ with respect to the signal component by the synchronous addition for n times. Further, in the present embodiment, when the data length (the number of samples) of signal Rsum obtained by the superposition of the signal parts of the reflection wave is k, the component of the noise reduces relatively at a ratio of $1/\sqrt{(n \times k)}$ with respect to the component of the reflection wave from tag 200. That is, the synchronous addition processing allows enhancement of the SN ratio when identification information attached to tag 200 is read.

Reader 100 according to the present embodiment executes the above-described synchronous addition processing and the correlation calculation processing at each transmission frequency so as to sweep frequencies within the predetermined frequency band when stepwisely changing a transmission frequency of the electromagnetic wave. Thus, the intensity of the reflection wave in which the noise component is reduced can be obtained from tag 200 at each transmission frequency.

In the present embodiment, as described in FIG. 4, control device 130, for example, stepwisely changes the transmission frequency of the electromagnetic wave by 0.5 GHz each within a frequency band from 3.1 GHz to 10.6 GHz. Further, at this time, control device 130 controls the timing of changing the transmission frequency so that the predetermined code sequence is repeated for n times in the same transmission frequency, for example. Note that using the same repetition number of the predetermined code sequence at each transmission frequency here is to synchronously add the signal part for the same number of times at each transmission frequency.

Control device 130 specifies identification information of tag 200 based on the information on the intensity of the reflection wave from tag 200 at each transmission frequency obtained as above. Note that, in FIG. 5, the frequencies of f1, f2, f3, f4, and f5 are specified as resonant frequencies of tag 200, and the identification information of tag 200 is specified based on this frequency information.

[Effect]

As described above, reader 100 according to the present embodiment includes: transmission device 110 that repeatedly transmits an electromagnetic wave whose phase is modulated with a predetermined code sequence at a period corresponding to a code length of the predetermined code sequence; reception device 120 that receives a reflection wave from the identification target (here, chipless RFID tag 200), synchronously superposes a reception signal related to the reflection wave at a period of the code length, and calculates a correlation value between a result of the superposition and the predetermined code sequence; and control device 130 that controls the transmission device to change a transmission frequency of the electromagnetic wave in a stepwise shape so as to sweep frequencies within a predetermined frequency band, controls the reception device to calculate the correlation value at each transmission frequency, and specifies the attribute (here, identification information of chipless RFID tag 200) of the identification target based on the correlation value at each transmission frequency.

Embodiment 2

Figure 6:
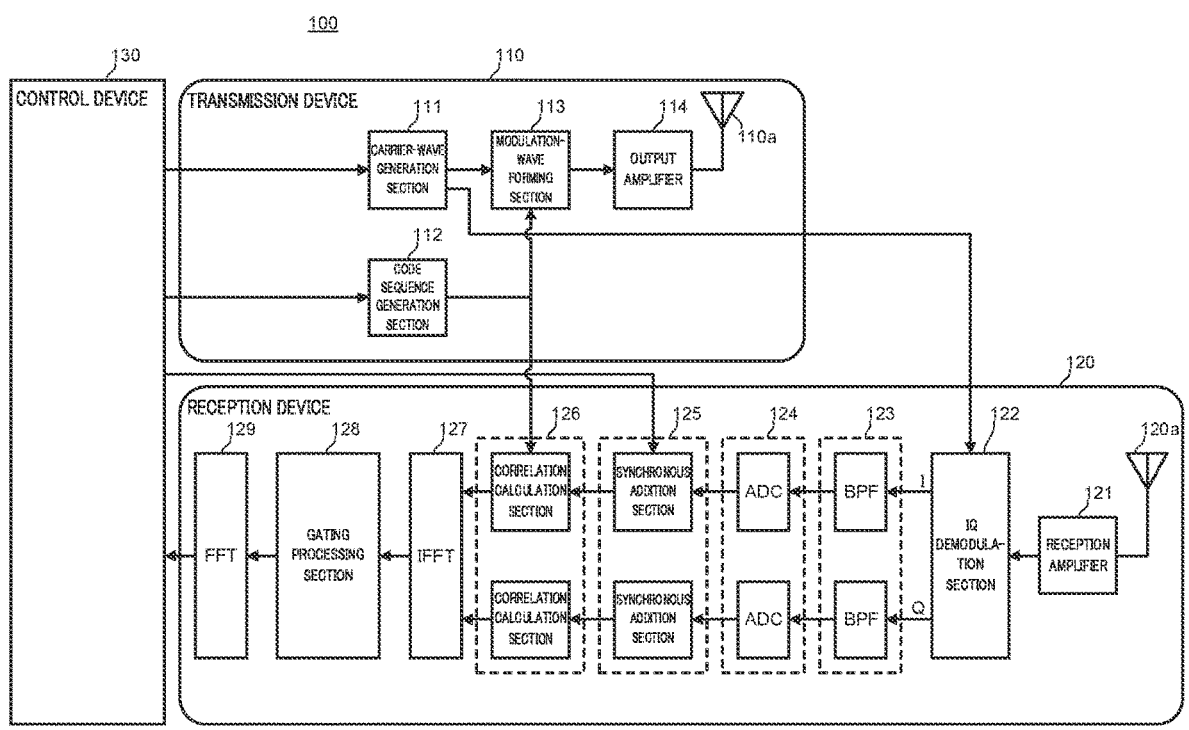
FIG. 6 illustrates a configuration of a reader according to another embodiment of the present invention.

FIG. 6 illustrates a configuration of reader 100 according to Embodiment 2.

Reader 100 according to the present embodiment is different from Embodiment 1 in that inverse Fourier transform section 127, gating processing section 128, and frequency analysis section 129 are provided in reception device 120 in addition to reception antenna 120a, reception amplifier 121, IQ demodulation section 122, bandpass filter 123, AD conversion section 124, synchronous addition section 125, and correlation calculation section 126. Note that the description of the configuration common to Embodiment 1 will be omitted.

FIG. 7 is a diagram for describing each process of inverse Fourier transform section 127, gating processing section 128, and frequency analysis section 129. Note that, in FIG. 7, FIG. 7A illustrates a reflection characteristic of tag 200 calculated in correlation calculation section 126, FIG. 7B illustrates an impulse response waveform of a reflection wave from tag 200 calculated in inverse Fourier transform section 127, and FIG. 7C illustrates a reflection characteristic of tag 200 calculated in frequency analysis section 129.

In general, a plurality of objects reflecting an electromagnetic wave (hereinafter, may be each referred to as electromagnetic-wave-reflecting object) are present around tag 200, which is the target for reader 100. Therefore, reader 100 also receives a reflection wave from the electromagnetic-wave-reflecting objects other than the targeted tag 200 when reader 100 obtains a reflection characteristic of tag 200. In addition, the electromagnetic waves caused by reflection inside the device itself and/or direct incidence from transmission antenna 110a to reception antenna 120a are also mixed at reception antenna 120a of reader 100 when the electromagnetic wave is transmitted from transmission device 110.

The signal component related to the above is not a noise component of white noise unlike thermal noise and is received as a signal phase-modulated with the predetermined code sequence in reception device 120. Thus, the signal component is not removed in correlation calculation section 126 and mixed as a noise component in the reflection characteristic of tag 200 calculated in correlation calculation section 126.

Figure 7A:
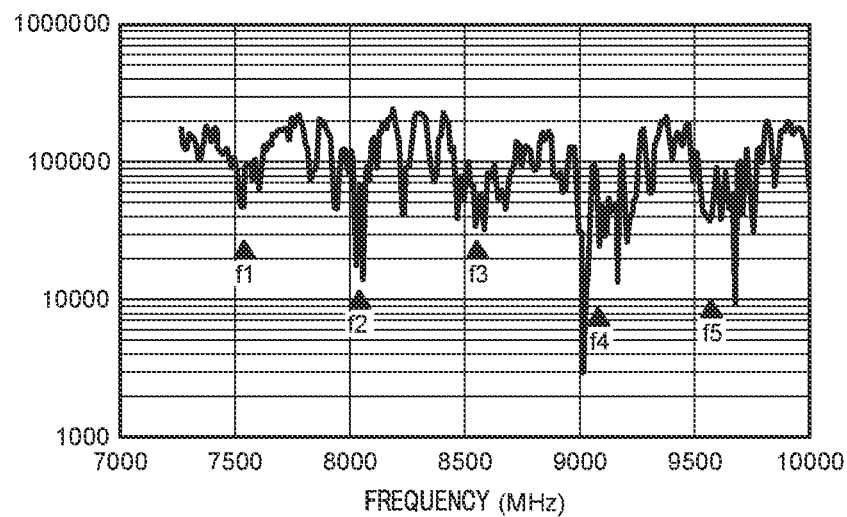
FIGS. 7A, 7B, and 7C are diagrams for describing each process of an inverse Fourier transform section, a gating processing section, and a frequency analysis section of the reader according to another embodiment of the present invention.

When control device 130 specifies the identification information of tag 200 based on the reflection characteristic of tag 200 including the noise component, the identification information of tag 200 may be erroneously recognized. Note that FIG. 7A illustrates a reflection characteristic of tag 200 when the reflection characteristic includes a large number of noise components caused by the reflection wave from the electromagnetic-wave-reflecting object other than tag 200 and diffraction of the transmitted electromagnetic wave inside the device of reader 100.

Then, reader 100 according to the present embodiment includes inverse Fourier transform section 127, gating processing section 128, and frequency analysis section 129 in reception device 120 in order to calculate a reflection characteristic of tag 200 in which the noise component caused by the reflection wave from the electromagnetic-wave-reflecting object other than tag 200 and diffraction of the transmitted electromagnetic wave inside the device of reader 100 is reduced.

In inverse Fourier transform section 127, an IQ signal (here, each correlation value of I and Q signals) of the electromagnetic wave in which the noise component of white noise is eliminated in correlation calculation section 126 after the synchronous addition at each transmission frequency is input. Then, inverse Fourier transform section 127 mathematically calculates an impulse response waveform of tag 200 with the IQ signal of the electromagnetic wave after the synchronous addition at each transmission frequency, and outputs the impulse response waveform to gating processing section 128. Note that, instead of each correlation value of I and Q signals, the IQ signal after the synchronous addition may be directly input to inverse Fourier transform section 127.

The IQ signal after the synchronous addition at each transmission frequency includes the phase information of the reflection wave from tag 200 at each transmission frequency in addition to the amplitude information of the reflection wave from tag 200 at each transmission frequency of the electromagnetic wave. Considering that a signal distributed with a uniform amplitude on all frequency axes is a delta function on the time axis in general, information on the response characteristic related to the amplitude and the phase of the target (here, tag 200) at each frequency when an electromagnetic wave of a single frequency is transmitted while the transmission frequency is changed so as to sweep frequencies can be regarded as information on the impulse response.

Figure 7B:
Figure 7B:
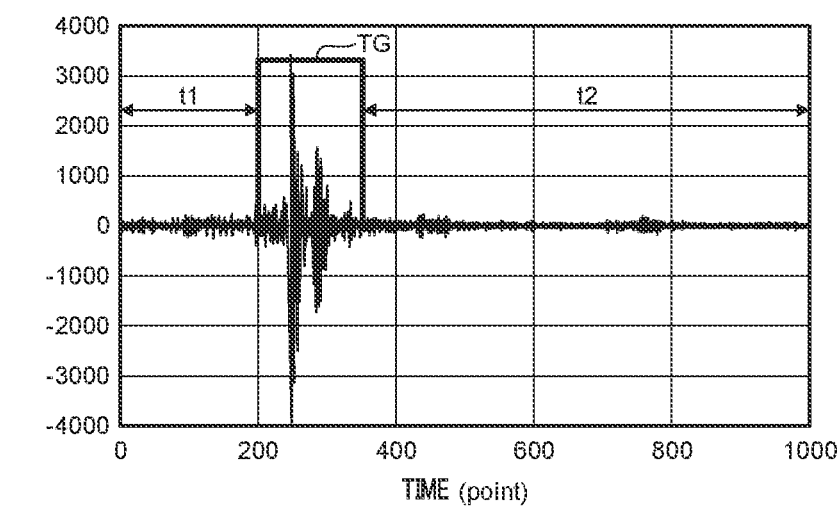

That is, information on the amplitude characteristic and the phase characteristic at each frequency over a predetermined frequency band is obtained from the IQ signal after the synchronous addition at each transmission frequency, and can be regarded as information on the impulse response to tag 200. Therefore, inverse Fourier transform section 127 can mathematically calculate the impulse response waveform of tag 200 from the IQ signal after the synchronous addition at each transmission frequency by the inverse Fourier transformation, as illustrated in FIG. 7B. Note that, in this case, the phase characteristic at each frequency corresponds to the shift amount (that is, time delay) of an approximate delta function on the time axis, and a time delay of the electromagnetic wave from transmitted from reader 100 until reflected to tag 200 and returned to reader 100 is determined from the phase information of the reflection wave from tag 200 at each frequency.

Gating processing section 128 extracts only the time domain (TG domain in FIG. 7B) in which the reflection wave from tag 200 arrives from the impulse response waveform generated by inverse Fourier transform section 127. At this time, gating processing section 128 may specify the time domain of the extraction target with the positional relationship between tag 200 and reader 100 estimated in advance, or may use the predetermined time before and after a peak positon, assuming that the area where the peak position is present in the impulse response waveform is the position where tag 200 is present.

Note that, in FIG. 7B, the noise appearing in the time zone of t1 is the noise originating from the diffraction of the transmitted electromagnetic wave inside the device of reader 100, and the noise appearing in the time zone of t2 is the noise originating from the reflection wave from the electromagnetic-wave-reflecting object other than the targeted tag 200.

Figure 7C:
Figure 7C:
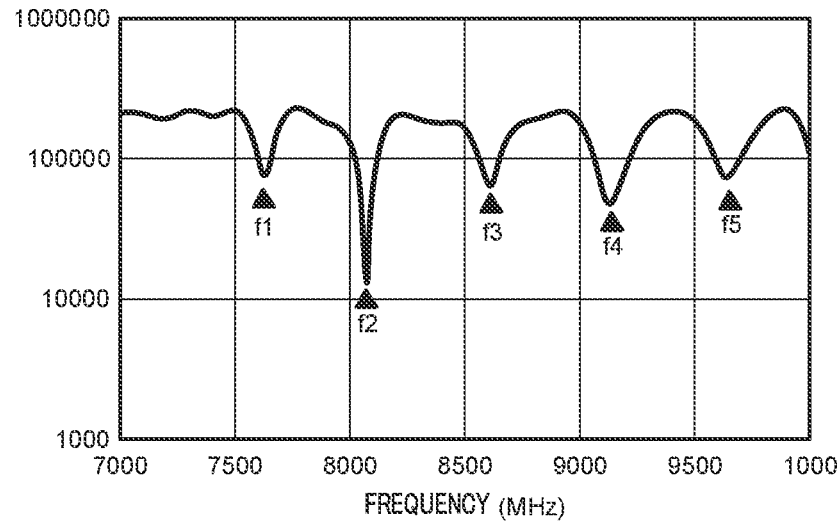

Frequency analysis section 129 performs a frequency analysis processing (e.g., FFT analysis processing) on the impulse response waveform (that is, the impulse response waveform of TG domain in FIG. 7B) extracted in gating processing section 128, and specifies a frequency characteristic of the reflection wave from tag 200 (see FIG. 7C). That is, frequency analysis section 129 calculates a frequency characteristic of a reflection wave from tag 200 from the IQ signal after the synchronous addition based on the signal component resulting from elimination of the noise component caused by the reflection wave from the electromagnetic-wave-reflecting object other than tag 200 and the diffraction of the transmitted electromagnetic wave inside the device of reader 100. Then, frequency analysis section 129 transmits the frequency characteristic of the reflection wave from tag 200 obtained as described above to control device 130.

Control device 130 specifies the identification information attached to tag 200 based on the frequency characteristic of the reflection wave from tag 200 generated by frequency analysis section 129. Note that, when the identification information attached to tag 200 is specified, control device 130 may refer to only one of the reflection characteristic of tag 200 calculated by correlation calculation section 126 and the reflection characteristic of tag 200 calculated by frequency analysis section 129, or may refer to both of them. For example, control device 130 may refer to the reflection characteristic of tag 200 calculated by correlation calculating section 126 to specify the identification information attached to tag 200 in a normal state, and may refer to the reflection characteristic of tag 200 calculated by frequency analysis section 129 for a regular noise check.

Further, control device 130 may obtain information related to the impulse response waveform from gating processing section 128, and, for example, estimate the distance between tag 200 and reader 100 by multiplying the time delay of the impulse response by the speed of the electromagnetic wave, for example. Such a configuration is useful, for example, when tag 200 or reader 100 is mounted on a moving body.

As described above, according to reader 100 of the present embodiment, it is possible to identify the attribute of the identification target with a simple configuration and high accuracy.

Embodiment 3

In the above-described embodiment, the reading of identification information of chipless RFID tag 200 has been described as an example of application of reader 100. However, reader 100 (hereinafter, referred to as "reader 100z") of the present invention can be applied to a state detection system that identifies a state of a chipless sensor tag detecting a state change of an object or an environment in a non-contact manner (e.g., see PTL 3).

Figure 8:
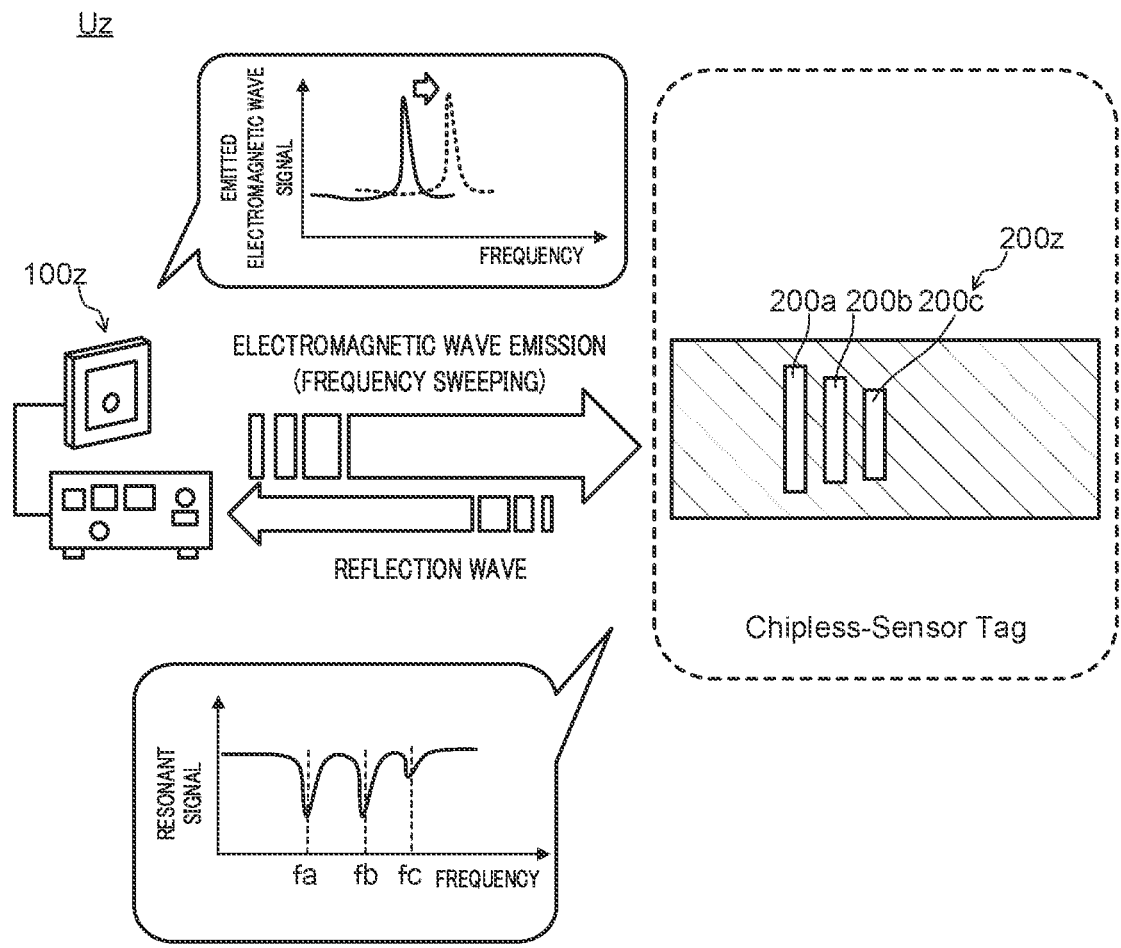
FIG. 8 illustrates an exemplary configuration of a state detection system according to the embodiment of the present invention.

FIG. 8 illustrates an exemplary configuration of state detection system Uz according to the embodiment.

State detection system Uz includes chipless sensor tag (hereinafter, referred to as "tag") 200z and reader 100z. The basic configurations of tag 200z and reader 100z are the same as the basic configurations of tag 200 and reader 100 according to the above-described embodiment.

Tag 200z includes, for example, resonant elements 200a, 200b, and 200c (e.g., a slot-type resonant element) in the same manner as tag 200 according to the above-described embodiment. Here, tag 200z is configured so that resonant elements 200a, 200b, and 200c respond to the state change of the surround environment of the detection target. That is, tag 200z changes the own electromagnetic wave reflection characteristic in accordance with the surround environment of the detection target. Note that tag 200z may include a stimulus-responsive portion (e.g., a portion that causes a dielectric-constant change around tag 200z so as to respond to the change in the temperature around tag 200z) having a good response to the state change of the detection target around resonant elements 200a, 200b, and 200c.

The state information of the detection target that tag 200z indicates is expressed by, for example, a pattern of a reflection wave spectrum of tag 200z. More specifically, the state information of the detection target that tag 200z indicates is expressed by the expression state of the resonant peak appeared in the reflection wave spectrum (e.g., the position of the resonant peak, the number of resonant peaks, or the interval between a plurality of resonant peaks).

The state change to be detected by tag 200z includes, for example, a change in the position of the object around tag 200z, a change in the shape of the object around tag 200z, a change in the water content of the object around tag 200z, a change in the humidity of the environment around tag 200z, a change in the temperature of the environment around tag 200z, a change in the gas concentration of the environment around tag 200z, a change in the light illuminance of the environment around tag 200z, a change in pH of the environment around tag 200z, a change in the magnetic field of the environment around tag 200z, and a change in the oxidation degree of the object around tag 200z.

Reader 100z transmits the electromagnetic wave to tag 200z while changing the transmission frequency, and receives the reflection wave to obtain the current data of the reflection wave spectrum of tag 200z. Then, reader 100z estimates the current state of the detection target based on the current data of the reflection wave spectrum (that is, the electromagnetic wave reflection characteristic) of tag 200z.

In state detection system Uz, the state of the detection target is detected as a change in the dielectric constant around tag 200z (that is, resonant elements 200a, 200b, and 200c) and as a change in the reflection spectrum resulting from the dielectric constant around tag 200z (that is, resonant elements 200a, 200b, and 200c). At this time, the state of the detection target is typically detected as a change in the position of the resonant peak (that is, resonant frequency), a change in the peak intensity of the resonant peak, or a change in the reflection intensity of the baseband area in the reflection wave spectrum of tag 200z. That is, reader 100z estimates the state change of the detection target based on the presence or absence of the resonant peak, the attenuation of the resonant peak, the shift of the resonant peak, and the change in the peak shape of the resonant peak.

In such a configuration, state detection system Uz can estimate the current state of the detection target of tag 200z with high accuracy from the change in the electromagnetic wave reflection characteristic of tag 200z. As described above, the reader of the present invention can also be suitably used for state detection system Uz that detects a state change of an object or an environment in a non-contact manner.

Specific examples of the present invention have been described in detail; however, the specific examples are only examples and are not intended to limit the claims Techniques described in the claims include various modifications and changes made to the specific examples illustrated above.

The disclosure of Japanese Patent Application No. 2020-096142, filed on Jun. 2, 2020, including the specification, drawings, and abstract, is incorporated herein by reference in its entirety.

INDUSTRIAL APPLICABILITY

According to the reader of the present disclosure, it is possible to identify an attribute of an identification target with high accuracy and a simple configuration.

REFERENCE SIGNS LIST

U RFID system
100 Reader
110 Transmission device
110a Transmission antenna
111 Carrier-wave generation section
112 Code sequence generation section
113 Modulation-wave forming section
114 Output amplifier
120 Reception device
120a Reception antenna
121 Reception amplifier
122 IQ demodulation section
123 Bandpass filter
124 AD conversion section
125 Synchronous addition section
126 Correlation calculation section
127 Inverse Fourier transform section
128 Gating processing section
129 Frequency analysis section
130 Control device
200 Chipless RFID tag
200a, 200b, 200c Resonant element
Uz State detection system
100z Reader
200z Chipless sensor tag

The invention claimed is:

1. A reader emitting an electromagnetic wave to an identification target and reading an attribute of the identification target from a reflection characteristic of the identification target, the reader comprising:

a transmission device that repeatedly transmits a modulation wave including an electromagnetic carrier wave whose phase is modulated with a predetermined code sequence, wherein the predetermined code sequence has a period corresponding to a code length of the predetermined code sequence and the signal wave is repeatedly transmitted for multiples of the period of the code length;

a reception device that receives reflection waves from the identification target, each of the reflection waves is a reflection of the signal wave corresponding to the code length of the predetermined code sequence, synchronously superposes the reflection waves, and calculates a correlation value between a result of the superposition and the predetermined code sequence; and a hardware processor that controls the transmission device to change a transmission frequency of the electromagnetic wave stepwise so as to sweep frequencies within a predetermined frequency band, controls the reception device to calculate the correlation value at each transmission frequency, and specifies the attribute of the identification target based on the correlation value at each transmission frequency.

2. The reader according to claim 1, wherein the transmission device includes:

a carrier-wave generation section that generates the electromagnetic carrier wave;

a code sequence generation section that generates a signal including the predetermined code sequence; and a modulation-wave forming section that modulates a phase of the carrier wave with the predetermined code sequence to form the modulation wave and transmits the modulation wave to a transmission antenna; and the reception device includes:

an analog-to-digital (AD) conversion section that converts the reception signal into a digital signal;

an in-phase/quadrature (IQ) demodulation section that converts the reception signal into an IQ signal;

a synchronous addition section that synchronously adds the IQ signal; and a correlation calculation section that calculates the correlation value between the IQ signal after the synchronous addition and the predetermined code sequence.

3. The reader according to claim 2, wherein the reception device further includes an inverse Fourier transform section that mathematically calculates an impulse response waveform of the identification target based on the IQ signal synchronously added at each transmission frequency.

4. The reader according to claim 3, wherein the reception device further includes:

a gating processing section that selectively extracts, from the impulse response waveform, a signal waveform in a time domain in which the reflection wave from the identification target arrives; and a frequency analysis section that specifies a frequency characteristic of the reflection wave from the identification target by analyzing a frequency of the signal waveform extracted by the gating processing section, wherein the hardware processor specifies an attribute of the identification target based on the frequency characteristic of the reflection wave specified by the frequency analysis section.

5. The reader according to claim 1, wherein
the identification target is a chipless radio frequency identification (RFID) tag or a chipless sensor tag, and
the attribute of the identification target is identification information expressed by a reflection wave spectrum of the chipless RFID tag or a state of a detection target expressed by a reflection wave spectrum of the chipless sensor tag.

6. A radio frequency identification (RFID) system comprising the reader according to claim 1.

7. A state detection system comprising the reader according to claim 1.

* * * * *